United States Patent
Henrickson

[11] 3,782,763
[45] Jan. 1, 1974

[54] COUPLER BAND DEVICE

[75] Inventor: Henry G. Henrickson, Coeur D'Alene, Idaho

[73] Assignee: Kaiser Aluminum & Chemical Corporation, Oakland, Calif.

[22] Filed: Oct. 6, 1971

[21] Appl. No.: 187,020

[52] U.S. Cl............. 285/419, 285/424, 285/DIG. 4
[51] Int. Cl............................................. F16l 21/00
[58] Field of Search.................... 285/373, 419, 424, 285/DIG. 4, 410, 366, 367; 24/279, 280, 284, 285

[56] References Cited
UNITED STATES PATENTS

| | | | |
|---|---|---|---|
| 3,239,254 | 3/1966 | Campbell | 285/DIG. 4 |
| 1,172,690 | 2/1916 | Erickson | 24/279 |
| 3,189,969 | 6/1965 | Sweet | 24/279 |
| 954,673 | 4/1910 | Felker | 285/403 |
| 978,222 | 12/1910 | Schlofly | 24/410 |
| 1,881,593 | 10/1932 | Hossfeld | 24/279 |
| 3,101,209 | 8/1963 | Jorgenson | 285/DIG. 4 |
| 3,298,721 | 1/1967 | Wiley | 24/419 |
| 3,455,584 | 7/1969 | Henrickson | 24/373 |

FOREIGN PATENTS OR APPLICATIONS

| | | | |
|---|---|---|---|
| 952,178 | 3/1964 | Great Britain | 24/279 |
| 712,335 | 7/1954 | Great Britain | 24/279 |
| 43,424 | 6/1938 | Netherlands | 285/367 |

*Primary Examiner*—Dave W. Arola
*Attorney*—Paul E. Calrow et al.

[57] ABSTRACT

Coupling band device or collar for various types of culvert pipe sections and the like provided with improved flange elements for effecting and maintaining a sealed clamping engagement with the ends of adjoining pipe sections.

5 Claims, 6 Drawing Figures

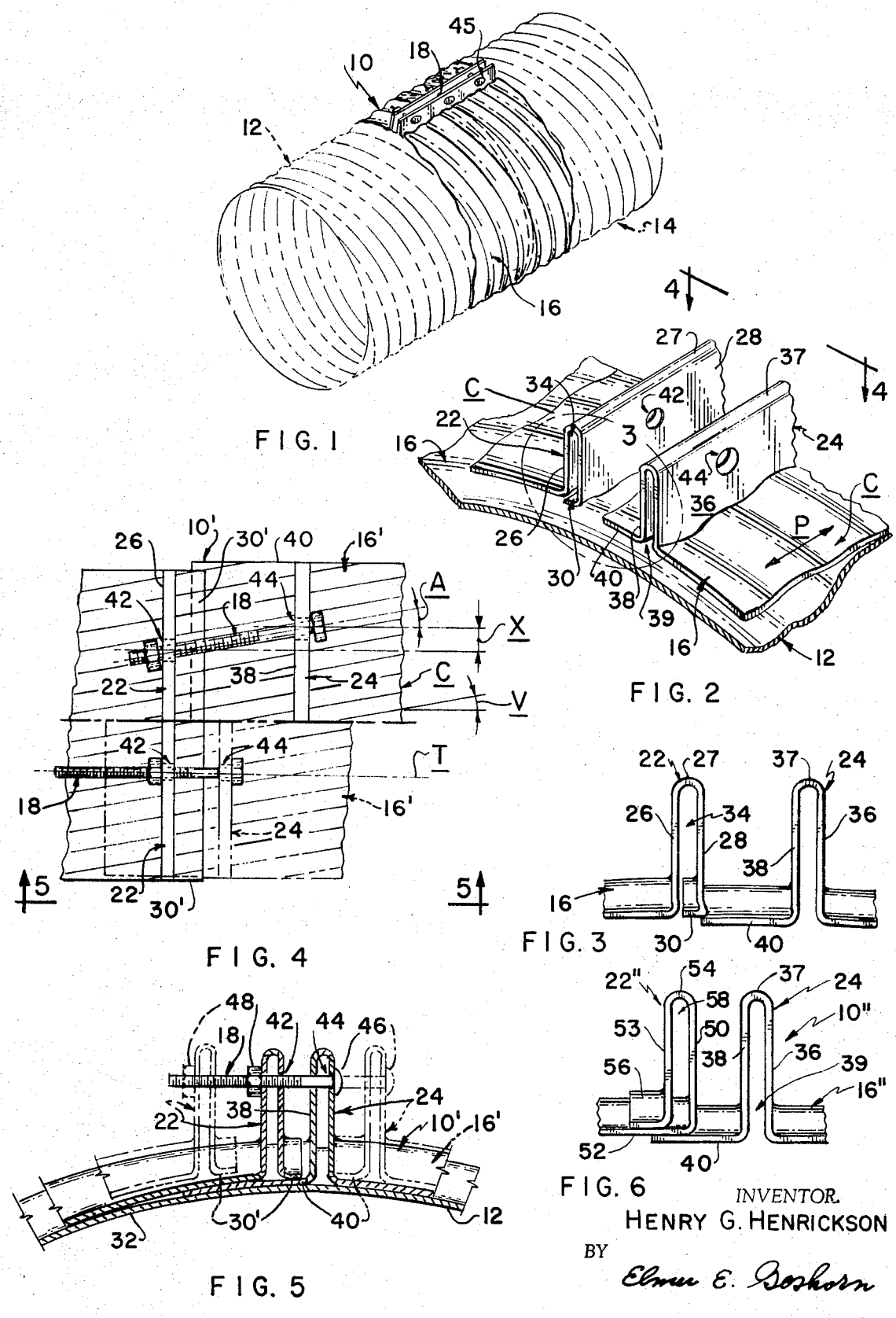

COUPLER BAND DEVICE

BACKGROUND OF THE INVENTION

The instant invention relates to a split coupling band device and more particularly it relates to an improved split and one-piece band device or collar for coupling together the ends of adjoining pipe sections.

Various band devices have been designed in the past for coupling adjoining pipe sections as exemplified by U.S. Pat. No. 954,673 to Felker; U.S. Pat. No. 978,222 to Schlafly; and U.S. Pat. No. 3,298,721 to Wiley. Prior one-piece coupling band devices, however, because of their construction were not always capable of maintaining satisfactory clamping pressure about adjoining pipe sections during various loading conditions and particularly where the pipe sections had external spiral convolutions because of the difficulties encountered in getting the band to properly seat upon the spiral convolutions and in the valleys of the pipe sections.

The present coupling device is adapted to join either corrugated or smooth pipe sections together and is generally comprised of a one-piece split coupling band element having integrally formed opposed and matching resiliently compressible and tensioned flanged ends together with a clamping mechanism connected to these ends for placing these flanged ends under tension, for contracting the band element about a pair of pipe sections and for sealing the band element to the pipe sections.

SUMMARY OF THE INVENTION

One of the primary purposes of the instant invention is to provide an improved split band device for holding the ends of adjoining pipe sections together in an improved vise-like manner regardless of various compressive and tension loads applied to the sections and/or band device.

The coupling band device comprises a one-piece split band coupling element which in a preferred embodiment has integrally formed opposed and matching resiliently compressible and springy flanged ends. One of the opposed flanged ends is provided with an outwardly projecting lip portion that is adapted to be overlapped by and to maintain contact with the bottom of the other flanged end.

The other flanged end can include a lip portion adapted to overlie and be in slidable engagement with the lip portion of the first named flanged end while projecting either forwardly or rearwardly of the main body of the other flanged end.

A clamping mechanism such as a bolt-nut assembly can extend between and interconnect the opposing flanged ends of the band element. Tightening of the bolt-nut assembly results in the desired clamping and hoop tensioning of the band about the outer periphery of a pair of pipe sections.

The split band element or collar may be smooth surfaced or it may be provided with corrugations intermediate its ends such as helical corrugations that generally match and correspond to the shape, size, etc. of the helical corrugations of the particular pipe sections being joined together.

BRIEF DESCRIPTION OF THE DRAWING

FIG. 1 is a perspective view of a typical pipeline joint wherein the coupling device of the instant invention is used;

FIG. 2 is an enlarged fragmentary perspective view of a portion of the pipeline joint shown in FIG. 1;

FIG. 3 is an enlarged end view taken within the bounds of encompassing line 3 of FIG. 2;

FIG. 4 is an enlarged top plan view of the coupling device as taken along line 4—4 of FIG. 2, with parts added and other parts broken away, and illustrates how the opposed ends of a slightly modified form of the coupling device can be disposed on opposite sides of the transverse center line of the device and arranged in different operative positions;

FIG. 5 is a sectional view as viewed along line 5—5 of FIG. 4 and illustrates in dotted and solid lines various operative positions of a preferred form of band device of the instant invention; and FIG. 6 is an enlarged end view similar to FIG. 3 and illustrates another modified form of band device of the subject invention.

DETAILED DESCRIPTION

With further reference to the drawing, FIGS. 1–3 illustrate one form of an improved overall contractible split coupling device 10 for coupling a pair of corrugated highway culvert pipeline sections 12 and 14 together. The device is generally comprised of a one-piece metal split band 16 and one or more clamping bolt assemblies 18 connected to opposed matching ends of the band element. Pipeline sections 12 and 14 usually have the same diameter and can be provided with corresponding helical corrugations as illustrated in FIG. 1. Upon the contraction of device 10 the coupling band device effects an improved and sealed clamping engagement with the coupled ends of pipe sections 12 and 14.

Another embodiment of the coupling band is illustrated by coupling band 10' of FIGS. 4–5 and the parts thereof which correspond to the parts of device 10 in FIGS. 1–3 have the same reference numerals unless otherwise specified. A further embodiment of the coupling band is illustrated by coupling band 10'' of FIG. 6.

When pipe sections 12 and 14 are made of aluminum, band 16, 16' or 16'' of device 10, 10' or 10'', as the case may be, is likewise made of aluminum and of a selected length that is somewhat greater than the circumference of the pipe sections about which the split band is to be fitted. The overall size of the band, its width and thickness, is usually dictated by the economics of manufacture and various installation requirements. When the pipe sections 12 and 14 are corrugated, i.e. provided with annular or spiral corrugations the band 16, 16' or 16'' of device 10, 10' or 10'' is roll formed with generally matching corrugations.

After initially forming band 16 and including corrugations when necessary, the opposed ends are shaped to be provided with matching resiliently compressible and integrally formed double folded or U-shaped flanges 22 and 24. The left-hand end of band 16 as viewed in FIGS. 1–3 is shaped in a suitable press so as to have an upstanding transverse flange 22 comprised of a flat rear wall 26 and a parallel flat front wall 28 joined to the rear wall by a somewhat generous or gradual arc 27 whereby the front and back walls will be appropriately spaced from each other for reasons to be discussed more fully hereinafter. The free end of wall 28 terminates in a lip 30 that is folded back in a rearward direction or towards rear wall 26. The length of lip 30 is usually less than the width of the hollow interior 34 between walls 26 and 28 and thus will only partially close off the bottom of the hollow interior 34. The bottom of lip 30 is preferably disposed in substantially planar alignment with the bottom of the main intermediate section of band 16 at its line of juncture with the bottom of rear wall 26 as depicted in FIGS. 2–3.

As indicated in FIG. 3, flange 22 may include an outwardly offset portion that is provided between the bottom of front wall 28 and the inner end of lip portion 30.

The matching flange 24 on the opposing side of band 16 is comprised of matching flattened rear and front walls 36 and 38 separated by a hollow interior 39 and joined at the top by a generous or somewhat shallow arc or bend 37.

The outer free end of front wall 38 as in the case of its counterpart wall 28 terminates in a lip 40 that is disposed at generally right angles to front wall 38 and projects forwardly of wall 38 for a distance that usually exceeds the height of wall 38. Lip 40 of flange 24 is of a substantially longer length than lip 30 on flange 22. Moreover, lip 40 is preferably of such a length that when band 16 is in an expanded condition upon initial placement of the expanded band about the end of a pipe section 12 or 14 the outer end of lip 40 of flange 24 can be initially overlapped by the inner end of lip 30 of flange 22 in the manner indicated in FIG. 3.

In another embodiment of device 10' and as illustrated in FIGS. 4–5 the lower free end of front wall 28 of flange 22 is folded forwardly of wall 28 so as to form a forwardly projecting lip 30'. Lip 30' has such a short length that upon initial emplacement of band 16' about the ends of pipe sections 12 and 14, the outer end of lip 30' will be spaced some distance from the lower end of front wall 38 of the opposed and matching flange 24 all as depicted in FIGS. 4–5. As in the case of lip 30 of band 16 the bottom of lip 30' is disposed in substantial planar alignment with the bottom of the main intermediate portion of band 16' at its line of juncture with the bottom of rear wall 26 of flange 22. As shown in FIG. 4, lip 30' preferably overlaps lip 40 when band 16' is in an expanded condition and emplaced about the ends of the pipe sections to be joined together.

As the result of forming opposed flanges 22 and 24 at the opposed ends of band 16 or 16' as aforedescribed lips 30 and 40 or lips 30' and 40' of the opposed flanges can be corrugated or recorrugated, as the case may be, by an appropriate press apparatus so as to enhance the overlapped matching engagement of lips 30 and 40 or lips 30' and 40 of opposed flanges 22 and 24 with each other as well as with the corrugations of pipe sections 12 and 14 as device 10 or 10' is clamped about pipe sections 12 and 14.

As indicated in various Figures of the drawing, the opposed walls 26 and 28 or 36 and 38 of the flange 22 or 24 of a band 16 or 16' are provided with a series of opposed spaced and aligned openings 42 and 44 respectively for receiving clamping bolt assemblies 18. For reasons that will become more fully apparent hereinafter the axes of directly opposed and alignable overall openings 42 and 44 of the opposed flanges 22 and 24 of a band 16 or 16' are normally offset somewhat transversely or laterally relative to each other, especially when the band 16 or 16' is expanded as indicated at X in FIG. 4. The extent of offset at X, which is dependent upon the adjustment of device 10 or 10', is small and varies from a slight fraction of the pitch P of a corrugation C to about three-fourths of the pitch P. The pitch P of a corrugation C is defined as that distance that extends between the same points of adjoining corrugations such as indicated at C in FIG. 2.

The various clamping bolt assemblies 18 used to draw the band 16 tightly about adjacent pipe section ends include a bolt 46 and a nut 48 connected to the threaded shank end of the bolt. The shank of a given bolt is adapted to freely and somewhat loosely fit within an opening 42 or 44 and is long enough to span the distances between the flanges 22 and 24 of a device 10 or 10' while bridging openings 34 and 39 of the device and still protruding a goodly distance from a flange wall at its shank end. Since the shank of a bolt assembly 18 has a diameter substantially less than a diameter of an opening 42 or 44, the bolt assembly is adapted to have limited pivotal movement relative to its associated flanges 22 and 24 of a device 10 or 10' upon the bolt assembly being connected to directly opposed and generally aligned openings 42 and 44 of the flanges 22 and 24 of the device as the device is being expanded or contracted. Because of the pivotal movement of a bolt-nut assembly relative to the opposed flanges 22 and 24 of a band 16 or 16', as will be more fully described below, the lips 30 and 40 or 30' and 40 of a band 16 or 16' are maintained in overlapped and matching relationship and the band 16 or 16' itself maintained in matched and seated relationship about the ends of pipe sections 12 and 14 both during emplacement and adjustment of the band about the pipe section ends.

Thus, when a band 10 or 10' is in an expanded condition and a bolt assembly 18 loosened, the longitudinal axis of the bolt assembly 18 tends to intersect a plane transverse of the band whereby it is positioned at an angle A that corresponds to the helix angle V of a corrugation C all as shown in FIG. 4. On the other hand when the same band 10 or 10' is contracted, as a bolt assembly 18 is tightened, the longitudinal axis of the bolt assembly tends to pivot and assume a new position whereby it lies in a plane that is disposed transverse of the band all as indicated by dotted line T in FIG. 4.

Another embodiment of the coupling device of the invention as best viewed in FIG. 6 is comprised of a front wall 50 extending upwardly from the left or outer end 52 of the major intermediate section of a band 16''. The rear wall 53 of the left flanged end of band 16'' is spaced from the front wall 50 and joined thereto by a generous arcuate shaped portion 54. The lower end of rear wall 53 usually terminates in a lip portion 56 that projects outwardly and rearwardly of the flanged end 22'' and is preferably disposed in overlapping engagement with the left end 52 at the top thereof. Since arcuate portion 54 extends rearwardly from front wall 50, the lower end of hollow interior 58 is closed off by the outer extremity of left end 52 in the manner shown in FIG. 6. During emplacement of band 16'' about pipe sections 12 and 14, the left end 52 of the main intermediate section of band 16'' or the bottom of flanged end 22'' thereof is preferably disposed in overlapping engagement with the outer end of opposing lip portion 40.

It is to be understood that lip portion 56 can, if desired, be corrugated or recorrugated in appropriate fashion after forming the flanged end 22'' of band 16''. As with band device 10 or 10', opposed and matching flanged ends 22'' and 24 are provided with opposed and alignable openings 42 and 44 for receiving a bolt-nut assembly 18, etc. as indicated in FIGS. 4–5.

It is observed here that the height of a flange 22, 24 or 22" above the major intermediate section of a band 16 or 16' or 16" at either end of a band should be such as to allow ample clearance space between the bolt-nut assembly and the lips 30 and 40 or 30' and 40, as the case may be, or between the bolt-nut assembly and the lip 40 and the left end 52 of the main intermediate section of band 16" throughout a wide range of expansion and/or construction of a device 10, 10' or 10". Moreover, the height of a flange 22 or 24 or 22" should be such as not to adversely affect the spring characteristics of the spaced walls 26 and 28 or 36 and 38 or 50 and 53 of a flange 22, 24 or 22" such as, e.g., excessive bending of the flange relative to the major intermediate section of the band 16, 16' or 16" upon contraction and tensioning of the band about the pipe section ends joined together by the band.

As the band 16, 16' or 16" is emplaced about pipe section ends, the inner end of corrugated lip 30 or 30' or the outer extremity of left end portion 52 is preferably disposed in initial overlapping engagement with the outer end of its associated or similarly corrugated lip 40. This means that lip 40 acts somewhat as a ramp for guiding lip 30 or 30' or left end 52 up and along lip 40 as band 16, 16' or 16" is contracted or expanded during adjustment about pipe ends 12 and 14. Because of the construction of the lip 30 or 30' or outer end 52 of a device 10, 10' or 10" slidable matching engagement is assured between a lip 30 or 30' or outer end 52 and its respective ramp 40 as the device is adjusted and accommodates itself to the pipe or culvert sections being joined.

Upon tightening of nuts and bolts 48 and 46 the separated walls 26–28, 36–38 and 50–53 of the various flanges 22, 24 and 22" act in the manner of spring washers and exert a selected tension on nuts and bolt heads which tend to keep the bolt and nut assemblies in a selected set locked condition at all times despite varying compression or tensile loads imposed on the pipe sections 12 and 14 and/or the band by the earth fill or the like surrounding the band, etc. The utilization of the flanged walls on the band which generally parallel the axis of the pipe sections in the manner of spring washers in conjunction with the improved overlapping of the various lip elements 30, 30' and 40 or outer end portion 52 and lip 40 means that sealed and clamping engagement between coupling band 16, 16' or 16" and a pipe end will be established and maintained under all normal loads to which the pipe sections and band will be exposed. Further the tensioning effect of the flanged walls along with the substantial overlap of lips 30 and 40 and 30' and 40 or the substantial over-lap of outer end 52 and lip 40 means that the band can, within limits, accommodate itself to various sizes of pipe and for all practical purposes compensate for manufacturing tolerances and errors in the manufacture of a pipe section of a given size.

The spring washer characteristics of the band 16, 16' or 16" can be enhanced if the band, when made out of aluminum, is made from a relatively hard tempered aluminum alloy of selected thickness, length and width such as for instance an aluminum clad aluminum alloy that is designed by the Aluminum Association as Alclad 3004 of H32 or H34 temper wherein the springback characteristics of the metal are quite pronounced.

In order to prevent foreign substances such as loose soil from entering openings 34 and 39 or 58 and 39 of flanges 22 and 24 or 22" and 24 and interfering with the sealed clamping engagement of device 10, 10' or 10" about the coupled together pipe section ends openings 34 and 39 or 58 and 39 can be appropriately filled with a suitable elastic-type filler such as one made of a proper grade of neoprene rubber material, elastic foam or a mastic material that will not adversely affect the resilient characteristics of flanges 22 and 24.

When a device 10, 10' or 10" is emplaced and adjusted about the ends of spirally corrugated pipe sections the limited pivotal movement of a bolt-nut assembly 18 of device 10, 10' or 10" during loosening and/or tightening of the bolt-nut assembly enables the opposed corrugated lips 30 and 40 or 30' and 40 or the end 52 and lip 40 to advantageously track or move relative to each other along the parallel helical paths provided by the individual corrugations C. Such pivotal movement enables a band 16, 16' or 16" to be fully seated about and sealed to the spiral corrugations at the ends of the pipe sections to be joined together. Upon progressive tightening of the various bolt-nut assemblies 18 of a coupling device 10, 10' or 10" the coupling device is gradually contracted and increasingly tensioned about the pipe sections progressively and in small increments.

Depending upon the width of band 16 or 16' or 16" and depending upon the diameter of pipe section ends to be joined together the clamping mechanism could be provided with any number of bolt-nut assemblies and not just the three assemblies shown in the drawing. Moreover the clamping mechanism instead of being a bolt-nut assembly may be any other suitable type of clamping mechanism such as, for instance, a snap-lock linkage assembly. Band 16 or 16' or 16" of the device 10 or 10' or 10" can be made with helical corrugations, annular corrugations or no corrugations at all.

Various advantageous embodiments of the coupling band device have been shown and described and modifications can be made therein without departing from the inventive concept set forth herein, wherein:

What is claimed is:

1. A culvert coupling band device for joining together and sealing the ends of a pair of helically corrugated culvert pipe sections, said device comprising a split one-piece springy metal band which encompasses each pipe section and is provided with a main intermediate helically corrugated portion and opposed and matching end flanges which are formed integrally with said intermediate portion and generally parallel the longitudinal axis of the encompassed pipe sections, each end flange having spring washer characteristics and being made up of spaced parallel flat walls joined by a somewhat generous arc, the free end of one flange terminating in an outwardly projecting lip that is adapted to fit under and be disposed in slidable underlying engagement with a selected portion of the metal band in the area of the other flange, said main intermediate portion of said band and said flange lip all being provided with corresponding helical corrugations and clamping elements engageable with the walls of the end flanges for compressing the said walls and tensioning said band about said pipe sections and for maintaining the lip of the one flange in full contact with the selected portion of the band in the area of the other flange.

2. A band device as set forth in claim 1 in which the selected band portion includes a lip portion on the other flange.

3. A band device as set forth in claim 1 wherein the band is made from a relatively hard tempered aluminum alloy material having pronounced springback characteristics.

4. A band device as set forth in claim 2 in which the said lip portion is provided with corrugations which match the helical corrugations of the lip of said first mentioned flange.

5. A band device as set forth in claim 2 wherein the lip portion of the other flange projects forwardly of the other flange.

* * * * *